May 3, 1966 C. P. SMITH 3,249,898
ADJUSTABLE MODULATOR APPARATUS
Original Filed Jan. 10, 1958 5 Sheets-Sheet 1

INVENTOR.
CALDWELL P. SMITH
BY
ATTORNEYS

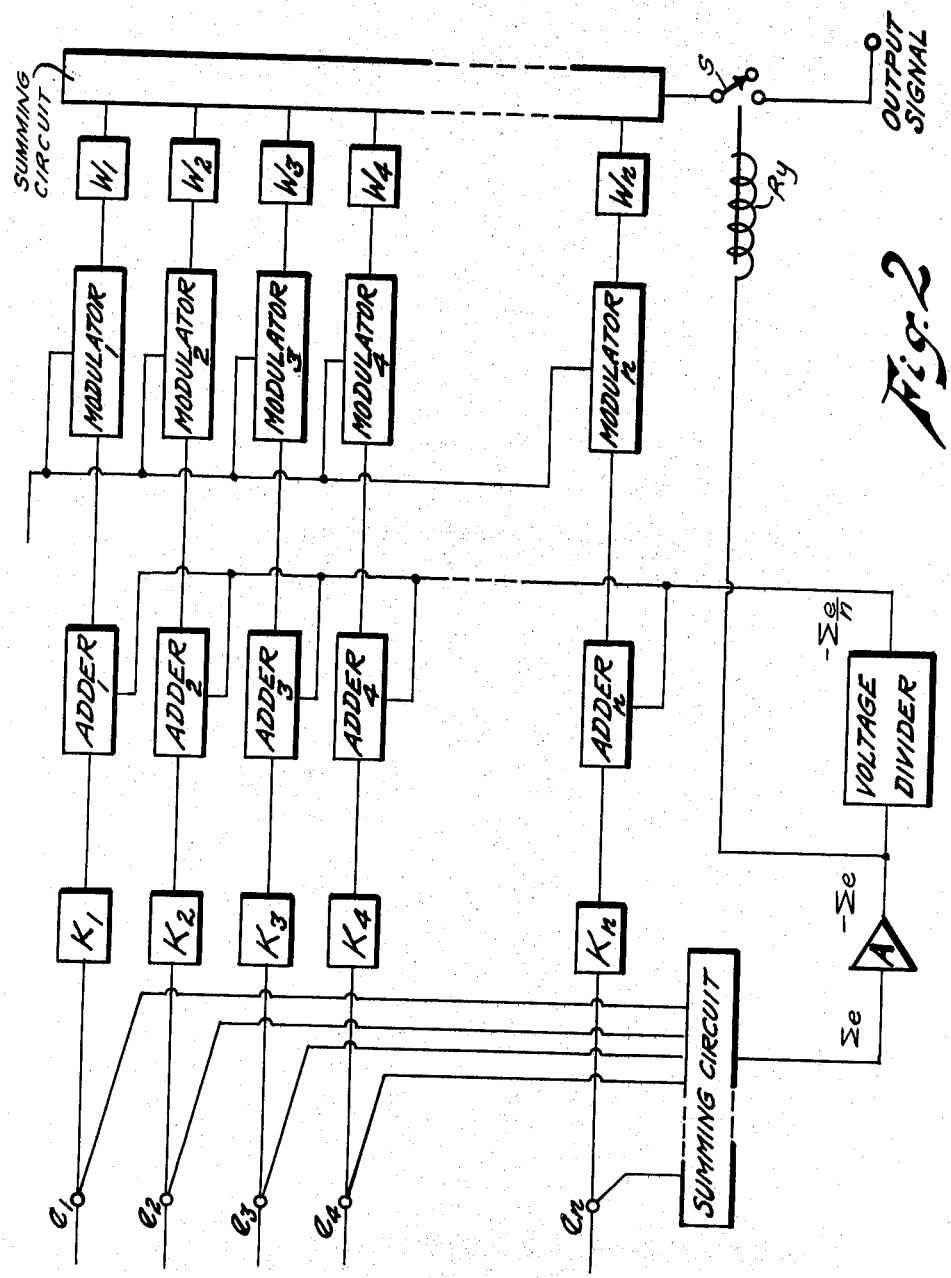

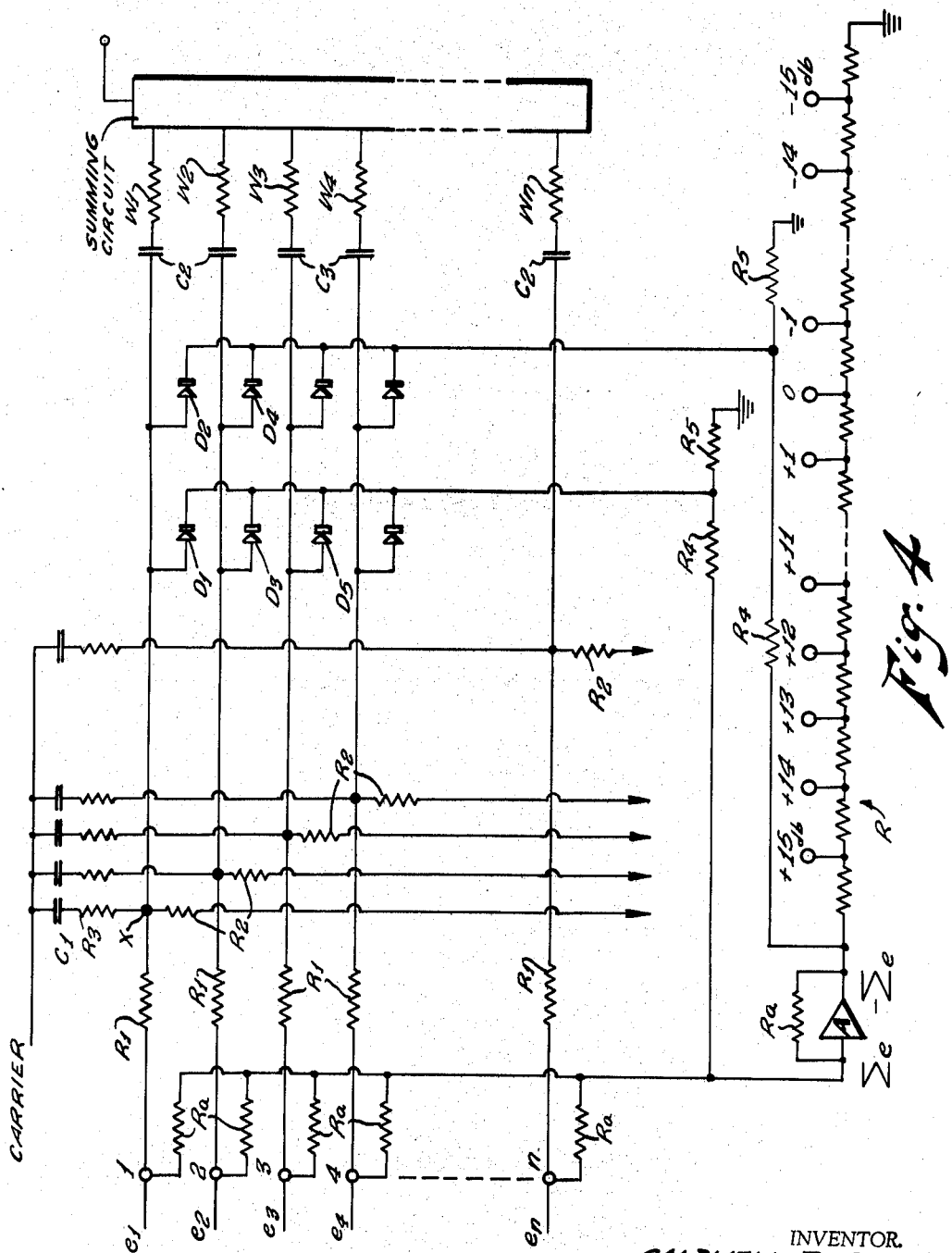

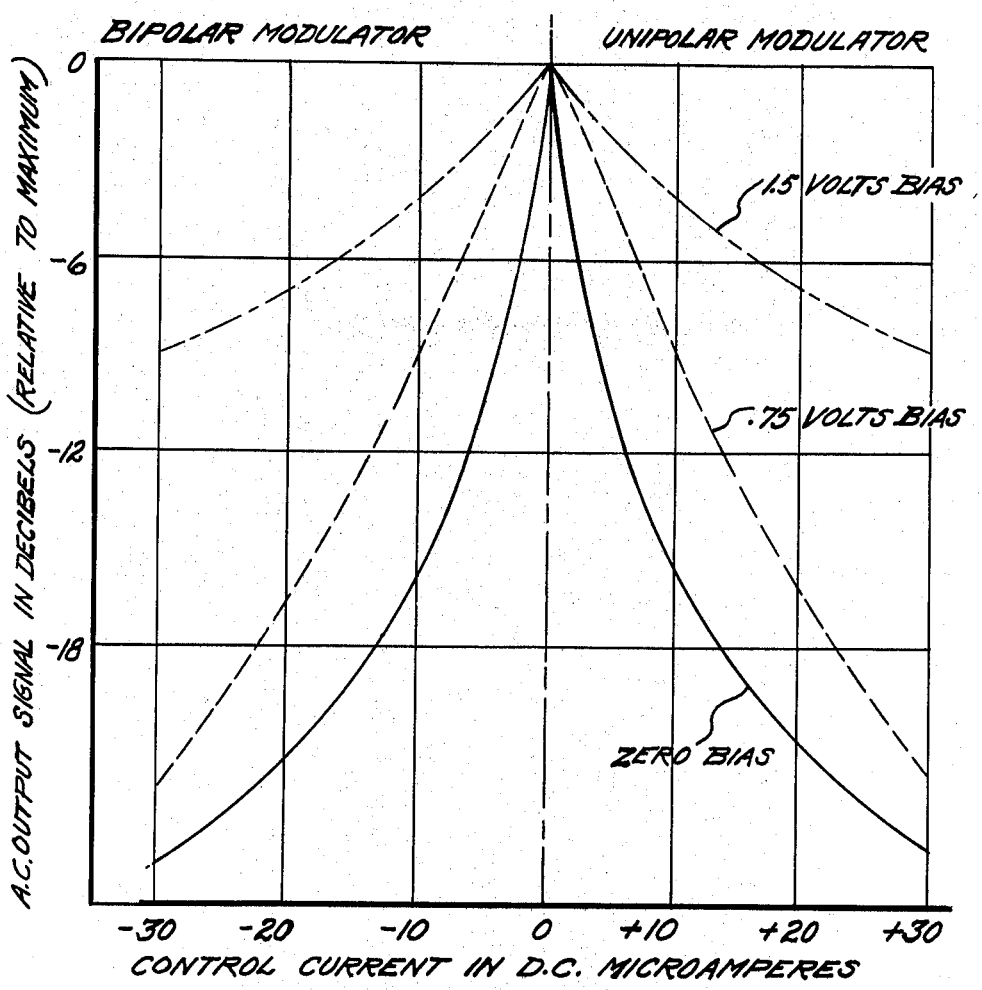

3,249,898
ADJUSTABLE MODULATOR APPARATUS

Caldwell P. Smith, Groton, Mass., assignor to the United States of America as represented by the Secretary of the Air Force
Original application Jan. 10, 1958, Ser. No. 708,336, now Patent No. 3,036,268, dated May 22, 1962. Divided and this application Feb. 13, 1962, Ser. No. 173,080
3 Claims. (Cl. 332—47)

The invention described herein may be manufactured and used by or for the United States Government for governmental purposes without payment to me of any royalty thereon.

This application is a division of my application, Serial No. 708,336, filed January 10, 1958, now Patent No. 3,036,268 issued on May 22, 1962.

This invention relates to the detection, measurement, and correlation of intelligence, and particularly of intelligence which manifests itself in a series of signals (audible or visible) whose frequency spectra establish patterns lending themselves to electronic analysis, thereby facilitating identification of specific characteristics constituting the distinguishing attributes of the intelligence undergoing examination.

The invention has utility as a means for analysis of voice signals (speech); as a means for measuring voltage or energy distribution; as a pressure pattern analyzer; as a means of measuring the distribution of heat, or radiant energy; and in quality control and analogous operations tending to follow known "probability" patterns.

The invention is characterized by the provision of electronic apparatus which—when applied to speech analysis, for example—operates to compare a graduation of speech signals with a set of known coefficients presenting a desired configuration of amplitudes constituting a reference pattern. Signals are derived from the comparison process in such manner as to produce a measurement, at each segment of the examined pattern, that is indicative of relative signal distribution only; that is, the indicated result of the pattern-matching operation is independent of signal amplitudes, per se, and reflects only the over-all amplitude pattern, or relative distribution. Thus the system's accuracy is not impaired by sensitivity to the continuously varying amplitudes of successive speech sounds, the response being therefore a true measure of significant speech content, in contra-distinction to mere sound. Moreover, the degree to which the system discriminates as between significant speech content, and mere sound amplitude, is controllable by simple adjustment of the design parameters.

Another important feature of the invention is the provision of means for rendering the pattern-matching system adjustable for the purpose of discriminating on the basis of relative importance of the "match" at various segments of the pattern: critical segments of the pattern can be made to generate a more sensitive indication of the 'fit' than is obtainable from the non-critical segments. The relative importance of any element of the pattern can be adjusted at will. This "second-order" weighting of the pattern is independent of the generalized pattern-matching, and can be given any desired configuration.

Other characteristics and objects of the invention will be indicated in the following description of the invention as illustrated in the accompanying drawings wherein:

FIGS. 2, 4 and 7 are schematic diagrams of pattern-matching correlator circuitry;

FIGS. 3 and 5 are graphs showing modulator behavior; and

Figure 1:
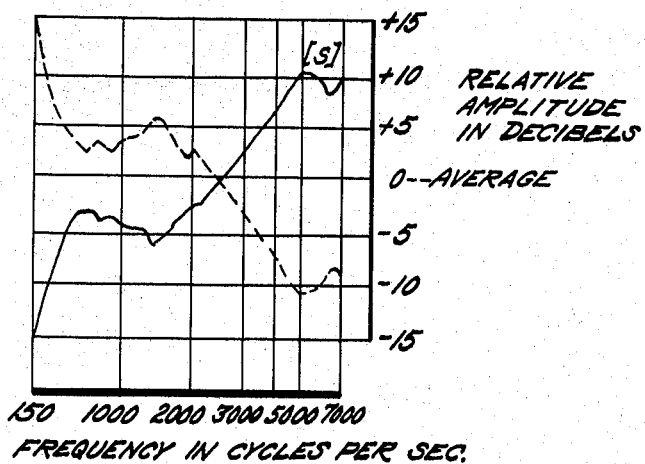
FIG. 1 illustrates an average pattern for the sound of the consonant "s," when uttered in ordinary speech.

FIG. 1 illustrates an average pattern for one particular consonant sound, as above noted. The word "pattern," in this context, is intended to refer to the frequency spectrum of the sound, when uttered by one talker, before various vowel sounds. A problem exists in presentation of the data in order that the differences between this consonant and other consonant sounds can be ascertained. The present invention solves this problem by normalizing the data: the voltage on each filter channel is compared with the average voltage for all of the filter channels, and this ratio is expressed in decibels:

For the $i$th channel, $$K_i = 20 \log_{10}|e_i| - 20 \log_{10}|\Sigma_n e|$$

where:

$e_i$ = voltage measured on $i$th channel
$\Sigma e$ = sum of voltages measured on all channels
$n$ = number of channels From this computation there are derived spectrum "patterns" that are independent of the signal amplitudes, thus permitting direct comparisons to be made, and average spectra computed.

From these considerations, in turn, there can be developed an electronic pattern-matching technique to automatically classify speech sounds, which technique uses a normalizing procedure analogous to the data computations. FIG. 2 illustrates the basic circuitry.

The voltages to be measured appear on the set of terminals $e_1, e_2, e_3, \ldots e_n$. The pattern with which the voltages are to be compared is specified by the coefficients $K_1, K_2, K_3, \ldots K_n$. These coefficients represent the pattern coordinates expressed in amplitude ratios, or in decibels, with respect to an average value. Since they are with respect to an average value, $$\Sigma K = 0_{db}$$

by definition.

Referring to FIG. 1, a pattern for the average (s) spectrum would be devised with a set of coefficients equal to the amount of deviation from the $0_{db}$ reference line, for each frequency channel of the analyzing filter set. For positive values of the ordinates shown in FIG. 1, attenuators having attenuation in decibels equal to the value of the ordinate are required. For negative values of the ordinates of FIG. 1, amplifiers having the specified amplification in decibels for each frequency channel are required. Thus the set of matching coefficients or K's establish a pattern that is the invert of the spectrum "norm": it is the inverted image of the normalized distribution that it is desired to "match."

The weighted voltage $K_i e_i$ (where $K_i$ is now expressed as an amplitude ratio) is now fed to an adding circuit. In the adding circuit the weighted channel voltage is added to the negative of the average voltage for all $n$ channels. If the pattern "matches," the sum of these two voltages is exactly zero. If the distribution of voltages does not match the pattern specified by the K's, the adder produces a voltage of positive or negative polarity, having magnitude proportional to the error.

The conformity of the electronic pattern-matching circuitry to the graph of FIG. 1, becomes obvious. In FIG. 1, the data is normalized by referring the signal in each frequency band to the average for all of the bands. The electronic circuitry proceeds in the same fashion: the summing circuit derives a voltage that is the sum of the voltages $e_1, e_2, e_3, \ldots e_n$. A calibrated voltage divider divides the sum by $n$, where $n$ is the number of channels. Thus a signal is generated that is the average of the voltage in all of the channels, and in each channel the voltage, suitably weighted, is compared with the average voltage. The difference between the two signals is zero, when the distribution matches the pattern.

Figure 3:
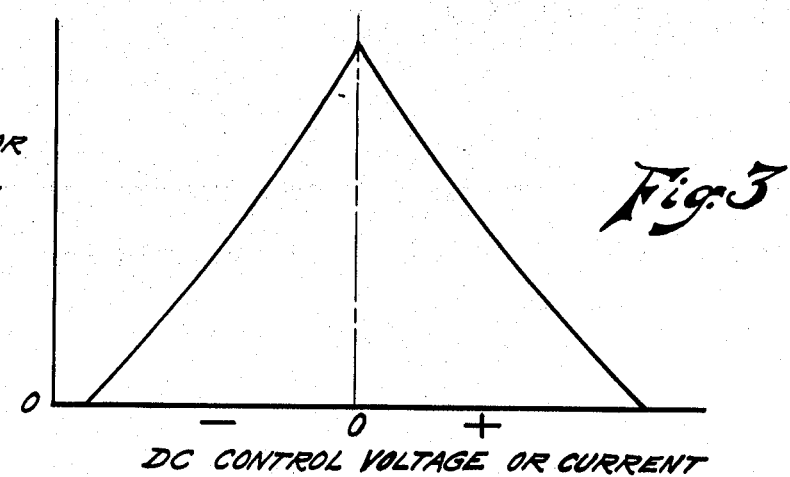

The output signals from the various adder circuits are fed into modulators. The modulators have a control signal input, and a carrier signal input, and are characterized by having an output voltage that is a maximum when the control signal amplitude is zero, and the output voltage decreases as a function of the amplitude of the control signal, being symmetrical in its characteristics, i.e., independent of the polarity of the control signal, as illustrated in FIG. 3. The modulator may have various circuit configurations, such as using vacuum tubes, diodes, saturable reactors, and other devices as are well known in the communications art for achieving this type of function, or, it may take the form of the diode modulator shown in this description.

The outputs from the various modulators are summed in a summing circuit to produce a signal $\Sigma e_{ac}$ proportional to the sum of the output voltages from all of the modulators of the pattern. This summing circuit may take any of the various circuit configurations well known in the electronics art for producing the sum of a set of voltages, such as pentode tubes with a common plate resistor, triode tubes with a common cathode resistor, feedback amplifier summer, etc.

The summed signal $\Sigma e_{ac}$ provides a measure of correlation between the set of input voltages $e_1$, $e_2$, $e_3$ etc. to the correlator, and the pattern represented by the coefficients $K_1$, $K_2$, $K_3$ etc. When the distribution of voltages "matches" the pattern specified by the set of coefficients, the sum signal $\Sigma e_{ac}$ will have its greatest amplitude, since for this condition the output from each adder circuit will be zero volts, and therefore the output from each modulator will be a maximum. This condition of "pattern match" is independent of the absolute amplitudes of the voltages being measured, and is only affected by their relative distribution or pattern.

The switch S, operated by relay $R_y$ disables the output signal when there is no voltage input to the pattern-matching device, i.e., when $\Sigma e = 0$. This disabling feature can also be provided by other features of the circuit, as is shown subsequently in this description.

The elements $W_1$, $W_2$, $W_3$, etc. of FIG. 2 provide "importance" weighting to the output signals from the various modulators. If the various elements of the pattern represented by $e_1$, $e_2$, $e_3$, etc. are all equally important in the pattern-matching, the weightings $W_1$, $W_2$, $W_3$, etc. are all made to be equal. However, it is often true that different elements of a pattern have different relative importance, some elements being more critical as to exact magnitude, relative to the rest of the pattern, than others. If the elements of the distribution specified by $e_1$, $e_2$, $e_3$, etc. have varying importance, the W elements are selected so that they are graded in proportion to importance.

The weightings are achieved in either attenuator or amplifier circuits in the paths of the A.-C. signals from the various modulators prior to summation. If attenuators, as implied in FIG. 2, the most important elements are assigned the least attenuation, and the attenuation is made inversely proportional to the "importance" weighting. If amplifiers, the amplification is made proportional to the "importance."

If an analyzing system is constructed to use more than one pattern, there is an advantage in selecting the set of W's for each pattern so that $\Sigma W$=constant, i.e., normalizing the importance weightings. Thus the magnitude of the A.-C. signal $\Sigma e_{ac}$ is made equal for all patterns, for the condition that obtains when the distribution exactly matches the pattern. This facilitates determination of the pattern most closely matching a given distribution.

The pattern-matching correlator shown in FIG. 2 contains several innovations. It represents a novel way of achieving the desired function. Its output is independent of the absolute amplitudes being measured, being affected only by their relative distribution. It provides an extremely fine measure of pattern-matching or correlation. It provides a means of independently adjusting the relative importance of the pattern-matching for the various elements of the pattern.

FIG. 4 illustrates the pattern-matching system in detail. This diagram illustrates a particular circuit configuration to achieve the pattern-matching operation illustrated in simplified form in FIG. 2. Other types of electronic devices are well known in the electronics art for achieving the functions of modulators and adding circuits, and these can be substituted in the circuit of FIG. 4 without altering the basic function of my device, as long as the functions indicated in FIG. 2 and FIG. 3 are satisfied. The specific circuit of FIG. 4 contains additional innovations, that will be described.

Referring to FIG. 4, a set of voltages characterizing a distribution are distributed on the terminals 1, 2, 3, . . . n, where n is the last terminal of the set. These voltages specify an "unknown" pattern that is to be compared with a reference pattern, in order to ascertain the degree of similarity. The voltages $e_1$, $e_2$, $e_3$ etc. are D.-C. voltages; however, they may represent A.-C. signals, that have been rectified and filtered.

The input voltages are tapped off in resistors $R_a$ in order to derive their sum $\Sigma e = e_1 + e_2 + e_3 + \ldots e_n$. The summing circuit is contained in D.-C. amplifier A and feedback resistor $R_a$ which comprises a conventional adding circuit well known in the electronics art. An additional function is provided by this circuit in reversing the polarity of the $\Sigma e$ signal. Other adding circuits, such as pentode tubes with common plate load resistor, triode tubes with common cathode resistor, etc. such as are well known in the electronics art, can be substituted for the circuit shown to achieve the same function. Likewise, the reversal of polarity of the $\Sigma e$ signal can be achieved in the summing circuit, or in a separate phase-reversal circuit. The configuration of FIG. 4 achieves both of these functions.

At the output terminal of amplifier A is generated a voltage that is the negative of the sum of the voltages $e_1 + e_2 + e_3 + \ldots e_n$. This signal is connected across the tapped voltage divider R, which divides the voltage $\Sigma e$ in precise ratios.

The tapped voltage divider R acts as a reference element that can be used to establish the coefficients $K_1$, $K_2$, $K_3 \ldots K_n$ for any desired pattern. Referring to the system shown in FIG. 2, there the pattern coefficients are shown connected directly to the voltage terminals of $e_1$, $e_2$, $e_3$ etc. However, the elements establishing the pattern coefficients can either be in this signal path, or in the $\Sigma e$ path, without altering the operation of the device. This is easily seen, in the fact that the expression $$K_1 e_1 = \frac{\Sigma e}{n} \text{ and } e_1 = \frac{\Sigma e}{K_1 n}$$

are exactly equivalent.

FIG. 4 differs from FIG. 2, in that the pattern coefficients $K_1$, $K_2$, $K_3$ have been shifted to the $\Sigma e$ branch of the matching circuits, in order to achieve certain advantages that will be enumerated. The mode of operation is basically the same as previously described.

The tapped voltage divider R is constructed to provide a set of pattern coefficients that are specified by the voltage ratios established by the taps. It thus provides a means of readily changing a pattern, by merely changing the taps to which connections are made.

The voltage divider shown in FIG. 4 provides a choice of thirty different possible coefficients K for each element of the pattern, spaced in equal 1 decibel increments. This represents only one of many possible arrangements. Since 1 db amplitude ratios correspond to approximately a 10 percent incremental change, the tapped voltage divider R shown in FIG. 4 would permit patterns to be set up in the device having a maximum amplitude ratio of 30 decibels, with each element of the pattern specified to an accuracy of 10 percent or better. By providing suitable tapped voltage dividers, the amplitude ratio, and the number and value of the increments can be made any desired value; those specified in FIG. 4 provide a convenient set for voice analysis, and their values are set forth in the table appended hereto.

As an alternative to the arrangement shown, a separate voltage devider can be used for each element of the pattern, to achieve identical results.

Referring again to FIG. 4, the resistors $R_1$ and $R_2$ comprise the matching circuit in each channel. $R_1$ and $R_2$ have equal resistance, and serve to add together the voltage from a particular channel, and the weighted voltage from the tapped voltage divider. If the distribution $e_1$, $e_2$, $e_3$ etc. matches the set of coefficients $K_1$, $K_2$, $K_3$ etc., these two voltages are equal in magnitude and opposite in polarity; the current flowing into point $x$ through $R_1$ is exactly equal to the current flowing out of point $x$ through $R_2$, and the potential at point $x$ is zero. If the pattern does not "match," the two voltages are not equal, and a difference potential will exist at point $x$, causing current to flow through one of the diodes D.

The identical diodes D form one arm of an A.C. voltage divider, consisting of the isolating capacitor $C_1$ and the series resistor $R_3$. Similar circuits are common to each of the matching elements. A small A.-C. carrier voltage is impressed across this voltage divider circuit, thus forming a modulator.

The non-linearity of silicon, germanium, selenium, copper oxide and similar diode rectifying devices is well known in the electronics art. In the forward, or conducting direction, these devices exhibit a resistance that decreases with increased current flow. This property is exploited in the diode modulator of FIG. 4.

When a D.-C. current flows through either diode, the resistance of the diode decreases. The magnitude of the A.-C. carrier voltage appearing across the diodes is approximately $$E_{ac} \frac{R \text{ diode}}{R_3 + R \text{ diode}}$$

for small magnitude of $E_{ac}$. Thus, a decrease of the diode resistance causes the output signal to decrease. As a result, that fraction of the A.-C. carrier signal appearing across the diodes will have maximum amplitude when no D.-C. current is flowing through the diodes, and will decrease in amplitude proportional to the current that flows. Thus a modulator is formed, having the general characteristic shown in FIG. 3.

Other modulator circuits having the general characteristics shown in FIG. 3 can be substituted without altering the basic function of the correlator. Thus, saturable magnetic reactors, vacuum tube circuits, and other diode circuit configurations, such as are well known in the electronics art, can be used in place of the diode modulators shown. The circuit of FIG. 4 uses silicon diodes as modulators, as these are conveniently simple and compact, and when used as modulators in my circuit are extremely sensitive to small current changes.

FIG. 5 illustrates the characteristics of the silicon diodes in my modulator circuit, showing their sensitivity to very small changes in control current. It also illustrates how the sensitivity of the modulator circuit can be altered at will, by altering the bias voltage on the diodes. This characteristic of variable sensitivity is utilized in certain features of my pattern-matching correlator that will be described.

As indicated above, means have been provided whereby in each channel the channel voltage is compared with a reference pattern, established in terms of a set of coefficients describing a "standard" distribution of voltages, and the degree of matching is converted automatically to an A.-C. carrier signal in each channel. The A.-C. carrier signals from each modulator are added together in a summing circuit, through the coupling capacitors $C_2$ and weighting elements $W_1$, $W_2$, $W_3$ etc.

The coupling capacitors $C_2$ serve as a low-impedance path for the A.-C. signals, while isolating the summing circuit for D.-C., thus preventing interaction with the pattern-matching operation.

The elements $W_1$, $W_2$, $W_3$ etc. establish the relative importance of the degree of match for each element of the pattern; the W elements may be attenuators, as shown, or amplifiers. If attenuators, the attenuation in each channel is designed to be inversely proportional to the "importance" of that channel. The importance weighting is independent of the general pattern-matching process. It offers very useful features in the automatic analysis of voice signals by pattern-matching, and in automatic detection.

Figure 6:
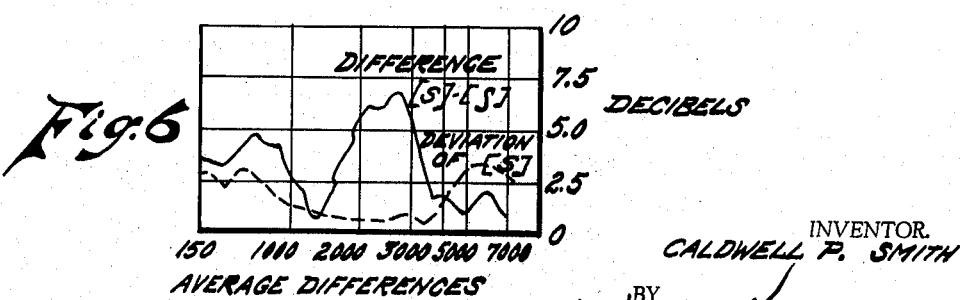
FIG. 6 is a graph showing a comparison of two consonant spectra.

FIG. 6 illustrates some measured differences in the frequency spectra of two consonant speech sounds. The average spectra of the two sounds have a maximum difference in the frequency region between 1500 and 3000 cycles per second. Below 1500 cycles per second, the differences between the two sounds are too small and variable to be of significance in discriminating the two sounds in terms of their spectra.

The "difference" plot of FIG. 6 indicates the relative importance of various frequencies in distinguishing the two sounds. In a pattern-matching voice analyzer, discrimination of these two similar speech sounds is facilitated by providing an importance weighting, that will give greatest prominence to those elements of the spectrum pattern that lie in the frequency range between 1500 and 3000 cycles per second.

Similarly, in analyzing the vowel sounds, the energy peaks, or formants, of the vowel spectra, are of much greater significance than the "valleys" or minima of the frequency spectra. By choosing appropriate weightings, the importance of these elements of the vowel patterns can be established, in a pattern-matching voice analyzer.

The pattern-matching system above described is independent of the amplitudes of the voltages $e_1$, $e_2$, $e_3$, ... $e_n$, being sensitive only to the pattern of their distribution. However, if the incoming distribution does not precisely match the pattern established in the machine, error voltages are developed in the various channels, proportional to the amount of error. These error voltages are also proportional to the magnitudes of $e_1$, $e_2$ etc.

If there were no compensation for this effect, the pattern "sharpness" would vary with voltage amplitudes, resulting in relatively "broad" pattern-matching when the sum of the voltages, $\Sigma e$ is small, and extremely "sharp" pattern-matching when $\Sigma e$ is large.

In some applications it may be useful to have the pattern-matching "sharpness" vary as a function of the magnitude of $\Sigma e$. In other applications, it is useful to maintain the pattern selectively constant. FIG. 4 illustrates a method of automatically compensating for changes in pattern sharpness, that will tend to keep the pattern sharpness constant. Compensation is achieved by automatic biasing of the operating points of the diode modulators.

Referring to FIG. 5, it can be observed that the diode modulators have either "sharp" or "broad" control characteristics, depending on the amount of D.-C. bias voltage that is applied. By tapping off a portion of the $\Sigma e$ and $-\Sigma e$ signals in resistors $R_4$ and $R_5$, the diode modulators are automatically biased in proportion to the magnitude of $\Sigma e$. Thus an increase in the average voltage automatically broadens the diode modulator characteristic, to compensate for the sharpening effect that would otherwise occur.

Still another function is provided by the diode biasing circuit. When Σe drops to zero, the bias on the diode modulators is automatically shifted to an operating point such that the diodes conduct sufficiently to reduce the A.-C. output signal below a threshold value, thus disabling the system. This function replaces the use of the switch and relay in FIG. 2.

Figure 7:
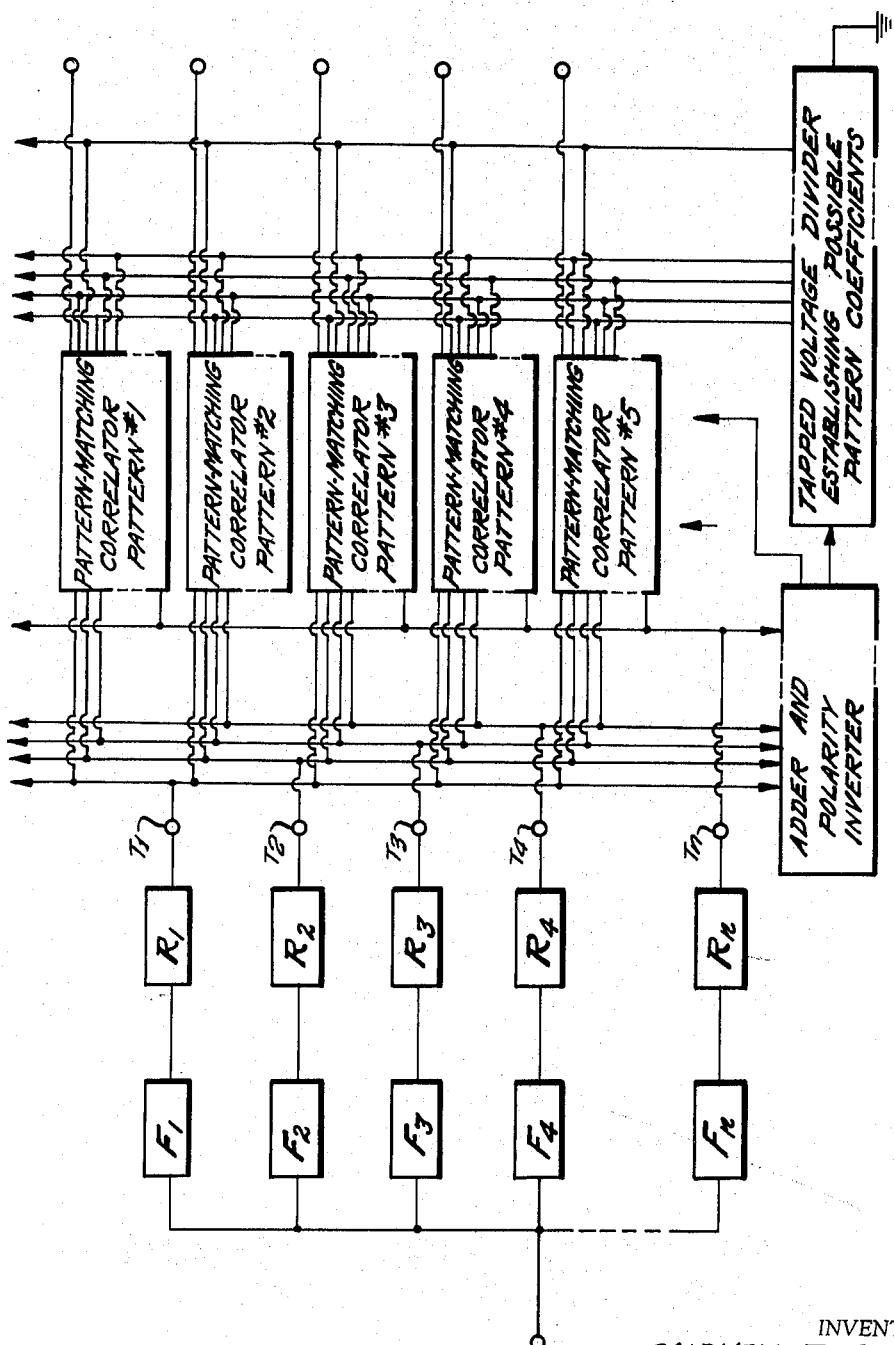

FIG. 7 illustrates a voice signal analyzer system using my pattern-matching elements for the automatic identification of speech sounds. A conventional set of speech analyzing filters and rectifiers are used to generate a set of D.-C. signals whose distribution on the terminals $T_1$, $T_2$, $T_3$ etc. are related to the speech sound at each instant. The analyzing filters and rectifiers may be of the structure shown in my U.S. Patent 2,691,137, or of the structure shown in H. W. Dudley's U.S. Patent 2,248,089 or other sets of filters appropriate for resolving the frequency spectra of speech sounds.

Voltages appearing on terminals $T_1$, $T_2$, $T_3$ etc. are added up in a summing circuit similar to that shown in FIGS. 2 and 4 to generate a signal that is the sum of the various voltages. The polarity of this signal is reversed in a phase reversal amplifier, and the signal is divided into precise increments on a tapped voltage divider.

A multiplicity of patterns are connected to the terminals $T_1$, $T_2$, etc. Each pattern is designed to correspond to the average frequency spectrum for a particular, significant speech event, i.e., a speech sound, or a portion of a speech sound. These patterns are all of the type shown in FIG. 4. Thus a voice signal is automatically classified in terms of the set of patterns.

Following is a table showing values suitable for the tapped voltage divider in order to establish the indicated weighting coefficients:

| Weighting coefficients K in decibels | Voltage ratio | Position of tap on R |
|---|---|---|
| +15 | 5.61 | 5.61 R/n |
| +14 | 5.0 | 5.0 R/n |
| +13 | 4.46 | 4.46 R/n |
| +12 | 4.0 | 4.0 R/n |
| +11 | 3.54 | 3.54 R/n |
| +10 | 3.16 | 3.16 R/n |
| +9 | 2.82 | 2.82 R/n |
| +8 | 2.5 | 2.5 R/n |
| +7 | 2.24 | 2.24 R/n |
| +6 | 2.0 | 2.0 R/n |
| +5 | 1.77 | 1.77 R/n |
| +4 | 1.58 | 1.58 R/n |
| +3 | 1.41 | 1.41 R/n |
| +2 | 1.26 | 1.26 R/n |
| +1 | 1.12 | 1.12 R/n |
| 0 db | 1.00 | 1.00 R/n |
| -1 | .89 | .89 R/n |
| -2 | .795 | .795 R/n |
| -3 | .71 | .71 R/n |
| -4 | .63 | .63 R/n |
| -5 | .56 | .56 R/n |
| -6 | .50 | .50 R/n |
| -7 | .447 | .447 R/n |
| -8 | .40 | .40 R/n |
| -9 | .355 | .355 R/n |
| -10 | .316 | .316 R/n |
| -11 | .282 | .282 R/n |
| -12 | .250 | .250 R/n |
| -13 | .224 | .224 R/n |
| -14 | .200 | .200 R/n |
| -15 | .178 | .178 R/n |

In this table:

$R$ = total resistance of voltage divider
$n$ = number of voltages or pattern elements

What I claim is:

1. In an intelligence identifying system, a modulator apparatus comprising a source of A.-C. signals of small magnitude, a D.-C. control current source, means including a diode, a resistor, and a capacitor connected in series relation to said A.-C. signal source, said D.-C. control current source being connected in series with said diode to provide bias voltage controlling the degree of signal modulation, a second resistor connected to said D.-C. signal source, and A.-C. output terminals connected across said diode, the output across said A.-C. output terminals being independent of the polarity of said D.-C. control current source and said output having maximum amplitude when said D.-C. current is zero.

2. In an intelligence identifying system, a modulator apparatus comprising a source of A.-C. signals of small magnitude, a D.-C. control current source, means including a pair of diodes connected in parallel, back-to-back relationship with said A.-C. source, a pair of resistance means, said D.-C. control current source being connected in separate series circuits to each of said resistance means and to each of said diodes to provide bias voltage controlling the degree of signal modulation, means including a resistor and a capacitor connected in series relation to said A.-C. signal source, and A.-C. output terminals connected across said diodes, the output across said terminals being independent of the polarity of said D.-C. control current source, said output decreasing in amplitude with increasing amplitude of said D.-C. source and said output having maximum amplitude when the amplitude of said D.-C. source is zero.

3. The apparatus as described in claim 2 which further includes means for automatically controlling the bias of each of said diodes in proportion to the magnitude of the summed signal.

References Cited by the Examiner

UNITED STATES PATENTS

| | | | |
|---|---|---|---|
| 2,243,527 | 5/1942 | Dudley | 179—1 |
| 2,446,188 | 8/1948 | Miller | 332—47 |
| 2,535,303 | 12/1950 | Lewis | 307—88.5 |
| 2,556,200 | 6/1951 | Lesti | 307—88.5 |
| 2,576,026 | 11/1951 | Meacham. | |
| 2,666,816 | 1/1954 | Hunter. | |
| 2,685,615 | 8/1954 | Biddulph | 179—1 |
| 2,755,441 | 7/1956 | Gulnac | 307—88.5 |
| 2,799,829 | 7/1957 | Gordon et al. | 332—47 |
| 2,875,414 | 2/1959 | Wlasuk | 332—52 |
| 2,911,597 | 11/1959 | Lehman | 332—52 |
| 2,964,649 | 12/1960 | Vance | 307—88.5 |

ROY LAKE, *Primary Examiner.*

ROBERT H. ROSE, ALFRED L. BRODY, *Examiners.*

H. W. GARNER, *Assistant Examiner.*